United States Patent
Jacob et al.

(10) Patent No.: US 11,169,848 B2
(45) Date of Patent: *Nov. 9, 2021

(54) POWER AWARE SCHEDULING OF REQUESTS IN 3D CHIP STACK

(71) Applicant: International Business Machines Corporation, Armonk, NY (US)

(72) Inventors: Philip Jacob, Congers, NY (US); James P. Coghlan, Wappingers Falls, NY (US); Michael Grassi, Shokan, NY (US); Kirk Pospesel, Clinton Corners, NY (US); Marcel Schaal, Stuttgart (DE); Douglas J. Joseph, Danbury, CT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/741,854

(22) Filed: Jan. 14, 2020

(65) Prior Publication Data

US 2020/0285512 A1    Sep. 10, 2020

Related U.S. Application Data

(63) Continuation of application No. 16/151,850, filed on Oct. 4, 2018, now Pat. No. 10,579,425.

(51) Int. Cl.
*G06F 9/48* (2006.01)
*G06F 9/50* (2006.01)

(52) U.S. Cl.
CPC .............. *G06F 9/4893* (2013.01); *G06F 9/48* (2013.01); *G06F 9/4806* (2013.01);
(Continued)

(58) Field of Classification Search
CPC ........ G06F 9/48; G06F 9/4806; G06F 9/4843; G06F 9/4881; G06F 9/4893; G06F 9/50; G06F 9/5094
See application file for complete search history.

(56) References Cited

U.S. PATENT DOCUMENTS

| 8,042,082 B2 | 10/2011 | Solomon |
| 8,054,663 B2 | 11/2011 | Chung |
| (Continued) | | |

FOREIGN PATENT DOCUMENTS

WO    2008/041069 A2    4/2008

OTHER PUBLICATIONS

Cheng et al., "Thermal-Aware Task Allocation, Memory Mapping, and Task Scheduling for 3D Stacked Memory and Processor Architecture", IEEE 2013 Tencon—Spring, Apr. 17-19, 2013, pp. 1-4.
(Continued)

*Primary Examiner* — Charles M Swift
(74) *Attorney, Agent, or Firm* — Scully, Scott, Murphy & Presser, PC; Daniel P. Morris, Esq.

(57) ABSTRACT

A computer implemented method and system for managing power in a 3D chip stack formed of multiple memory layers each having a plurality of memory banks and a plurality of Through-Silicon-Vias (TSVs) connecting the memory banks. The TSVs are arranged in a plurality of subsets, each subset of TSVs connecting a corresponding vertical stack of memory banks aligned across a plurality of memory layers. The method includes determining a power delivery budget for each subset of TSVs connecting the corresponding vertical stack of memory banks based on memory requests, keeping track of memory requests to the memory banks of each vertical stack of memory banks and scheduling the memory requests to the memory banks of each vertical stack of memory banks based on the power budget. The memory
(Continued)

controller is configured with a scorecard scheduler to manage the memory requests based on the power budget.

20 Claims, 5 Drawing Sheets

(52) U.S. Cl.
CPC .......... *G06F 9/4843* (2013.01); *G06F 9/4881* (2013.01); *G06F 9/50* (2013.01); *G06F 9/5094* (2013.01)

(56) References Cited

U.S. PATENT DOCUMENTS

| | | |
|---|---|---|
| 8,233,303 B2 | 7/2012 | Best et al. |
| 8,516,426 B2 | 8/2013 | Bose et al. |
| 8,737,108 B2 | 5/2014 | Saraswat et al. |
| 2010/0001379 A1 | 1/2010 | Lee et al. |
| 2011/0080185 A1 | 4/2011 | Wu |
| 2013/0055185 A1 | 2/2013 | Bose |
| 2014/0070838 A1 | 3/2014 | Vukic |
| 2014/0085959 A1 | 3/2014 | Saraswat et al. |
| 2014/0140138 A1 | 5/2014 | Tran |
| 2015/0155039 A1 | 6/2015 | Tran |

OTHER PUBLICATIONS

Hur et al., "Memory Scheduling for Modern Microprocessors", ACM Transactions on Computer Systems, vol. 25, No. 4, Article 10, Dec. 2007, pp. 1-36.
List of IBM Patents or Patent Applications Treated as Related dated Jan. 14, 2020, pp. 2.

| Determining a power budget for the subset of TSV columns<br>S1 |
|---|

↓

| Keeping track of memory requests to the memory banks<br>S2 |
|---|

↓

| Scheduling the memory requests based on the<br>TSV power budget<br>S3 |
|---|

POWER AWARE SCHEDULING OF REQUESTS IN 3D CHIP STACK

This invention was made with Government support under Contract No.: H98230-12-C-0325 awarded by Department of Defense. The Government has certain rights in this invention.

BACKGROUND OF THE INVENTION

This disclosure is directed to computers and computer applications for managing power in a 3D chip stack and more particularly to computer-implemented methods and systems for power aware scheduling of requests in a 3D chip stack.

As future chip stacking technology advances, this will lead to a greater number of layers in a 3D stack. As the number of layers increases from today's 4 to 10 towards 40 or more, it will become increasingly hard to deliver power to all the layers. Issues will include voltage droop due to the numerous logic blocks powered by the same subset of Through-Silicon-Vias (TSVs). The TSVs will have insufficient power to handle all the memory requests for a large number of stacks. The above issue is yet to be encountered by current 3D chip designs as most stacks are limited to 3 to 8 layers. There is currently no solution to this critical issue for managing power.

SUMMARY OF THE INVENTION

In one embodiment, a computer implemented method for managing power in a 3D chip stack is disclosed. The 3D chip stack is formed of a plurality of memory layers, each memory layer having a plurality memory banks and a plurality of Through-Silicon-Vias (TSVs) connecting the memory banks of the plurality of memory layers. The 3D chip stack may also have a controller. The TSVs are arranged in a plurality of subsets, each subset of TSVs connecting a corresponding vertical stack of memory banks aligned across a plurality of memory layers. The method includes a step of determining a power delivery limit for each subset of TSVs connecting the corresponding vertical stack of memory banks based on memory requests. The method may further include keeping track of memory requests to the memory banks of each vertical stack of memory banks and scheduling the memory requests to the memory banks of each vertical stack of memory banks based on the power delivery limit for each subset of TSVs connecting the corresponding vertical stack of memory banks.

A computer system that includes one or more processors operable to perform one or more methods described herein also may be provided.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION OF PREFERRED EMBODIMENTS

Figure 1:
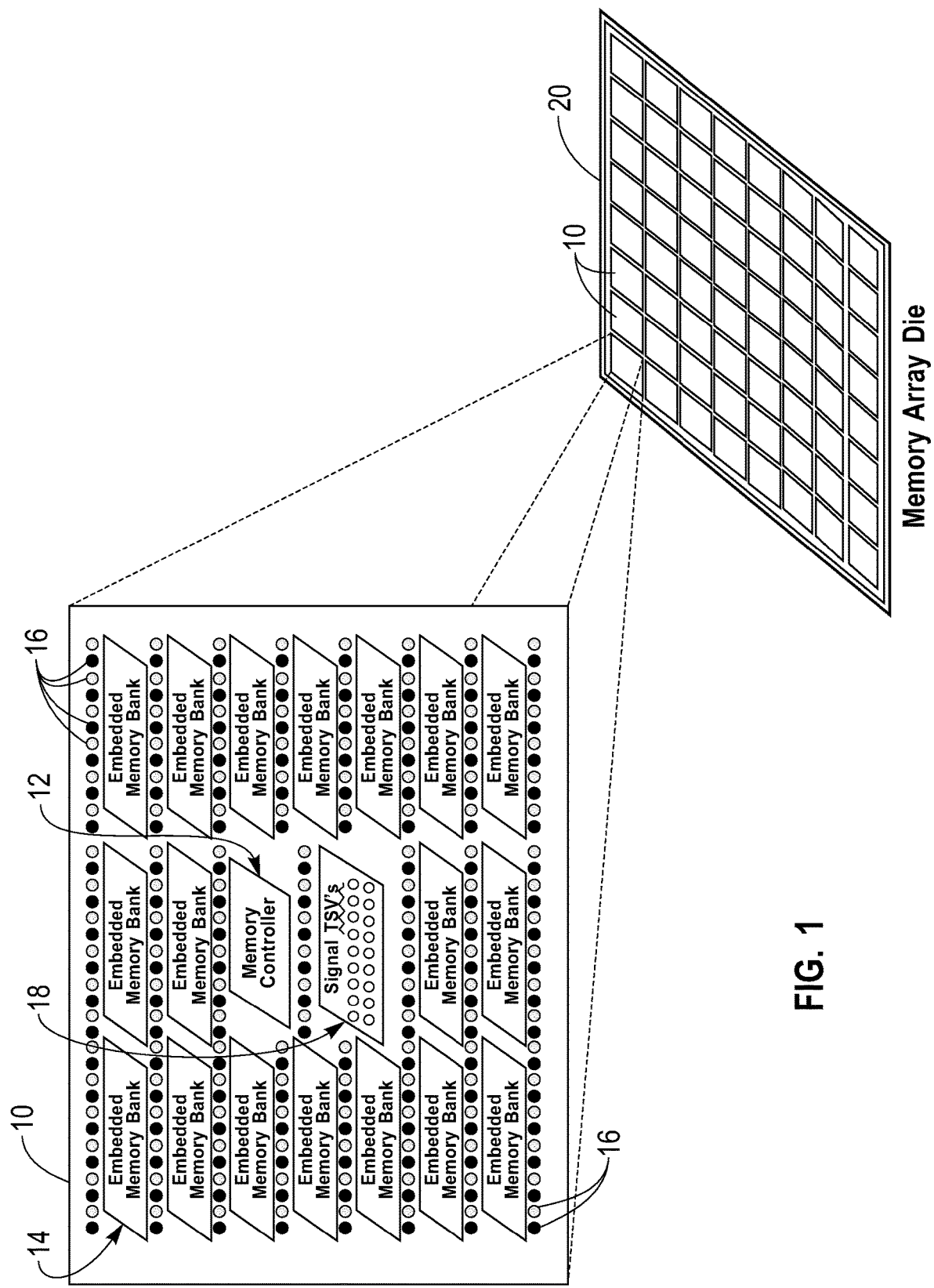
FIG. 1 is a block diagram of one embodiment of an embedded memory tile of a memory die of a 3D chip stack.

In one embodiment, this disclosure is directed to managing power in a 3D chip stack by scheduling memory subcommand requests such as read, write, scrub, refresh, etc. to different memory layers in the stack while being cognizant of the power delivery limit of the Through-Silicon-Via (TSV) columns connecting the banks of logic on each of the layers. In one embodiment, a scheduler optimizes the read/write requests to 3D memory, such as RAM, SRAM, DRAM, Phase change memory or other similar forms of storage logic in the 3D chip stack. This disclosure provides a solution to manage power delivery to different layers prudently using a scorecard based scheduler.

Logic in layers of a 3D chip stack is arranged in columns and share TSV for both data and power/ground connections. In a 3D memory stack of logic layers, the bottom layer feeds power to memory layers above it through the TSVs. Although power for the stack can be derived from any and all TSVs, the individual banks obtain the bulk of the power from adjacent TSVs.

The maximum power of a memory stack is the idle power of each layer plus the power required for the maximum number of simultaneous memory accesses. The total power delivered to the stack limits the maximum number of memory accesses to occur within the stack. As the number of layers in a 3D chip stack grows, there will be limitation in ability of the TSVs to deliver power to all the banks in the 3D chip stack.

Currently, TSVs provide power to all banks on a single die simultaneously and each bank receives power from a different subset of TSVs. However, an issue occurs when the active banks are aligned vertically across multiple dies. In this situation, a single subset of TSVs power all the active banks. Although the remaining TSVs on each die will provide power, voltage droop will occur within the vicinity of the active banks. However, as the number of layers in the stack significantly increase, increasing the number of TSVs would be counter-productive because as the height of the stack grows the required number of TSVs will crowd out the active logic.

The present disclosure provides a solution by having the memory controller manage the power requirements of different layers in the stack by scheduling data transfer requests to these layers without exceeding the power budget. In one embodiment, a power budget for each TSV is determined and the memory controller is configured to micromanage requests to memory banks in the 3D chip stack using scorecards. In one embodiment, the memory controller includes a scheduler for scheduling in the processor layer various tasks that need data from the memory.

The way the processor layer makes requests is not changed. In one embodiment, the memory controller in the stack is modified from the known prior art memory controllers in order to schedule the memory requests, such as, open page, read and close page operations, based on the power budget. The processor layer is oblivious to the operations in the stack.

Placing the scorecard scheduler within the memory controller to manage the memory requests to different banks is an improvement in the operation of the computer memory device itself. In one example, each read operation may require three sub commands, such as precharge, activate, read and a write operation requires a write sub command as well. There may also be other sub commands such as refresh and scrub to avoid losing data in the volatile memory. In one embodiment, the scorecard scheduler keeps track of these requests at this granularity.

FIG. 1 shows one embodiment of an embedded memory tile 10 with a memory controller 12, eighteen memory banks 14, power and ground TSVs 16 and signal TSVs 18. Typically, there will be a subset of separate power and ground TSVs 16 arranged to carry power for each memory bank 14. The memory tile 10, as shown in FIG. 1, is one of multiple embedded memory tiles 10 on a memory die 20 arranged in a 2D array of embedded memory tiles 10 that form each layer of a 3D stack.

The memory controller 12 for each memory tile 10 controls the various operations of the memory banks on the tile 10. The memory operations may include read, write, refresh, scrub and other known memory operations. The power and ground TSVs 16 carry the power and the signal TSVs 18 carry the data and address bits, to the memory banks 14 on the memory tile 10. The TSVs 16 and 18 pass through the multiple tiles connecting the layers in the 3D chip stack.

Figure 2:
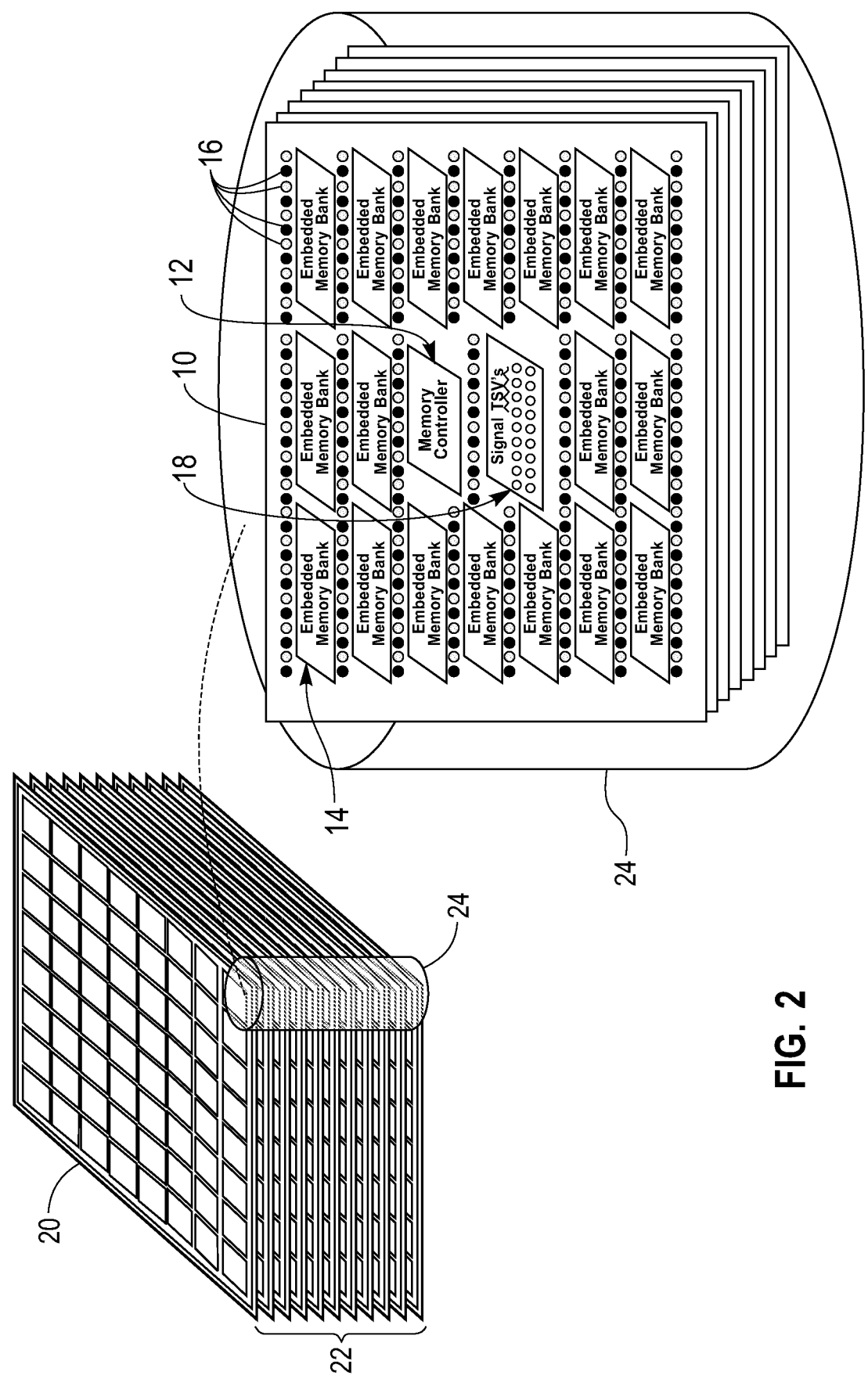
FIG. 2 is a block diagram of one embodiment of a 3D chip stack consisting of multiple memory dies and an exploded view of a vertical set of memory tiles.

FIG. 2 shows a 3D chip stack 22 consisting of multiple memory dies 20 stacked one on top of other to form the 3D chip stack 22. Also shown in FIG. 2 is an exploded view showing a vertical set of memory tiles 10 from each die layer 20 are stacked one on top of other. A subset of power and ground TSVs 16 as well as the signal TSVs 18 are connected between the different layers in the vertical set 24

Figure 3:
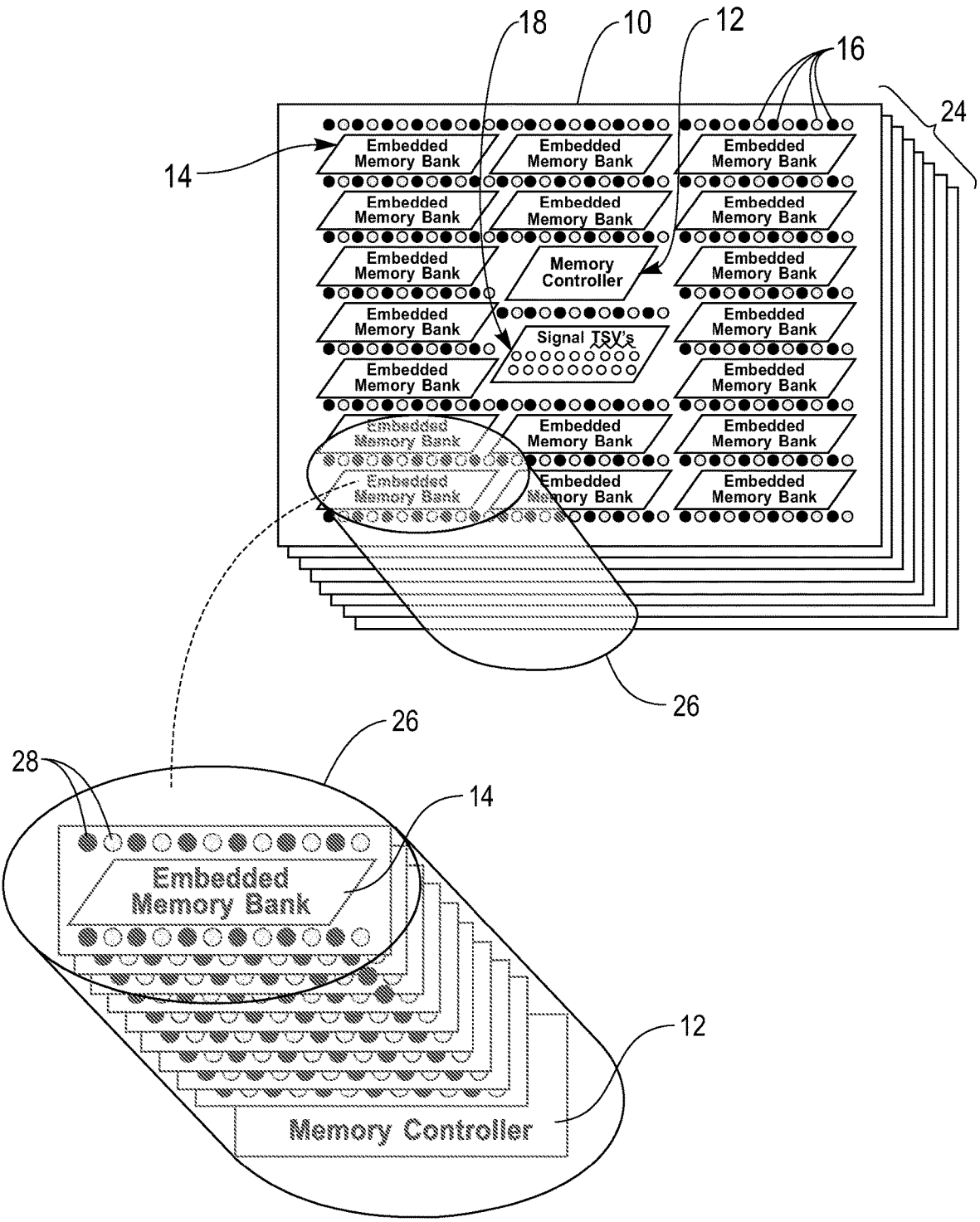
FIG. 3 is a block diagram of one embodiment of a vertical stack of memory tiles and an exploded view of a vertical stack of embedded memory banks.

FIG. 3 shows the vertical stack 24 of memory tiles 10. Also shown in FIG. 3 is an exploded view of a vertical stack 26 of embedded memory banks 14 with a subset of power and ground TSVs 28. As can be seen from FIG. 3, memory bank layers 14 from each layer of memory tiles 10 are stacked one on top of each other to form multiple vertical stacks 26 in the 3D chip stack. Each vertical stack 26 of memory bank layers 14 is managed by the memory controller layer 12. The controller layer 12 may be in the bottom layer of the vertical stack 26. The controller layer 12 will have most of the logic that controls the memory bank layers 14 and hence the scheduler too. The controller layer 12 can be placed anywhere in the stack and need not be the bottom layer.

Figures 4, 5:
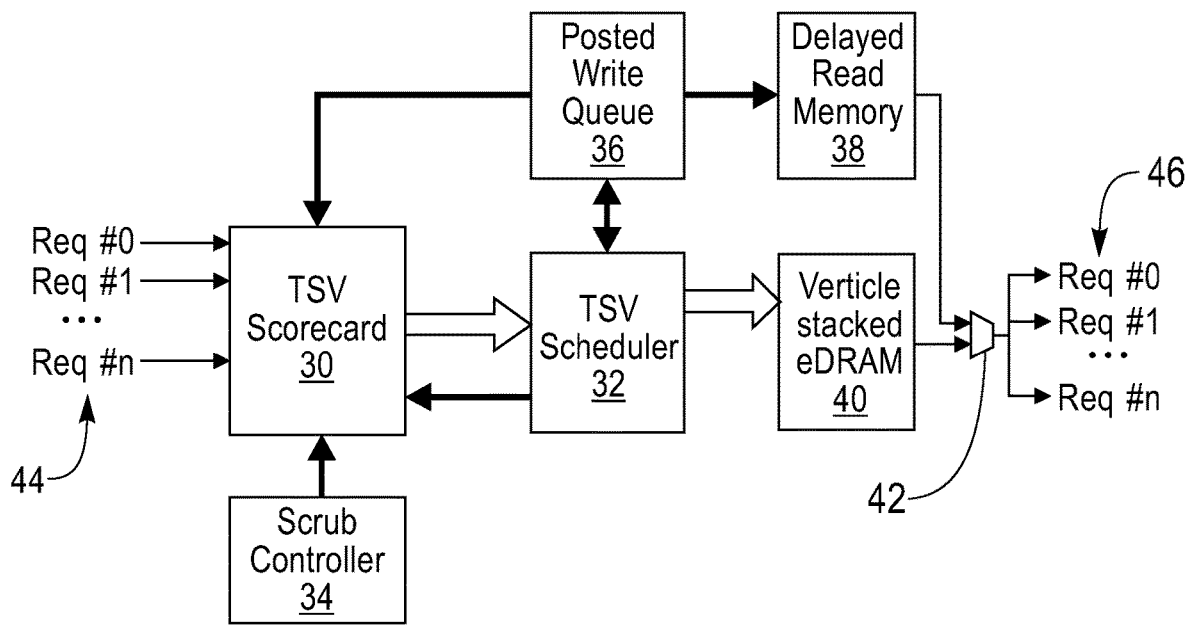
FIG. 4 is block diagram of one embodiment of a memory controller configured to include a TSV scorecard scheduler.
FIG. 5 is a flow diagram of one embodiment of the method disclosed in this specification.

FIG. 4 is a memory controller 12 modified to include a TSV scorecard 30 and TSV scheduler 32 to schedule memory requests. Embodiments for implementing the memory controller 12 are described below in connection with FIG. 6. The memory requests may be scheduled at the subcommand granularity, such as precharge, activate, read, write, refresh and scrub. This list of subcommands is for example purposes only and is not meant to be limiting. The TSV scheduler 32 TSV and scorecard 30 keep track of the requests. The TSV scorecard 30 ensures that only a limited set of requests are scheduled to the same vertical stack powered by the same set of TSVs. In one embodiment, power may be optimized by spreading the requests to different vertical TSV columns in the stack.

The scrub controller 34, posted write queue 36 and delayed read memory 38 in FIG. 4 are additional logic that may be included on the controller layer. Scrub controller 34 periodically scrubs the layers of the eDRAM 3D stack 40 for ecc errors and refreshes to avoid loss of charge on the DRAM capacitors. These scrub requests are also sent through the same TSV bus and therefore contributes to the overall requests going through the TSVs. The posted writes queue 36 and delayed read memory 38 may be included to avoid frequent bus reversals of the TSV bus. The TSV bus is configured to either read or write to the memory layers to/from the controller. The TSV bus needs to be reversed depending on whether it is being read or write and this causes a loss in cycle and therefore the throughput. By having posted write queue 36 and delayed read memory 38, one effectively clumps up all reads and writes so long as accesses are not to same memory addresses. The TSV scheduler 32 takes these inputs from regular memory requests (Req #0 . . . Req #n) 44 from the TSV scorecard 30, the posted writes from posted write memory 36 and delayed memory reads from delayed read memory 38 and decides on the schedule of the requests to be issued to the memory layers of eDRAM 3D stack 40. The responses to the requests (Resp #0 . . . Resp #n) 46 are output from the eDRAM 3D stack 40 through logic 42.

In one embodiment, the TSV scheduler 32 optimizes requests to the layers of an eDRAM 3D chip stack 40 that share TSV structures. The TSV scheduler 32 keeps tracks of how many tiles 10 of logic connected by the TSVs 16 are active and thereby allocates requests to different tiles 10 on the same die layer 20 or multiple layers 20 while keeping aware of total power budget that the power TSVs 16 can provide.

As described above, the memory banks 14 in each of the memory die layers 20 connected to the same set of TSVs 28 form a vertical column 26 of logic. The read/write requests to the memory banks 14 in the vertical stack 26 require precharge and activation of the page in the memory bank 14 before the data can be read or written. This consumes power and therefore all the memory banks 14 connected to the same set of TSVs 28 cannot be activated simultaneously for low power operations. In order to activate only the sub-set of memory banks 26 in a given cycle, the TSV scorecard 30 keeps track of the subcommands to be issued to each memory bank 14 of subset 26 and the TSV scheduler 32 arbitrates scheduling new requests to the memory banks 14 connected to the same power and ground TSVs 28.

In one embodiment the TSV scheduler 32 can be a counter for each vertical stack 26. The stack counter is incremented when a request is sent and decremented when the request is completed. Additional requests to the TSV columns 28 are not issued if the predetermined threshold is hit by the stack counter. The purpose of the TSV scheduler 32 is to avoid conflicts between multiple TSV responses. Some responses may be short and arrive in example two beats, while other requests may take eight beats to bring in all the data. The scheduler ensures no collision in the arrival of these responses over the shared TSV bus.

In one embodiment, the TSV scheduler 32 could be implemented with a FIFO with additional logic to control insertion, match and removal. Given that DRAM/memory layers have deterministic responses, one can determine in advance how many cycles later the response will arrive and how many slots in the FIFO it will take up for the response and place the request accordingly in the FIFO. The TSV scorecard 30 will keep track of outstanding requests to the FIFO. This can be something as simple as a counter/per layer/bank issued from the controller. Alternatively, it can be a more complicated FIFO structure that keeps track of all requests issued with layer numbers for each request. Additional logic could tally the requests for a given layer in an array that contains the tag of the request sent out. When the response is received, the tag identifies the entry in the TSV scoreboard 30 and clears it.

FIG. 5 is a flow chart of one embodiment of a computer implemented method for managing power in a 3D chip stack. In one embodiment the 3D chip stack is formed of a plurality of memory layers, each memory layer having a plurality memory banks and a plurality of TSV columns connecting the memory banks of the plurality of memory layers. The 3D chip stack also has a controller. The TSVs are arranged in a plurality of subsets, each subset of TSVs connecting a corresponding vertical stack of memory banks aligned across a plurality of memory layers. The method includes step S1 of determining a power delivery limit for each subset of TSV columns connecting the corresponding vertical stack of memory banks based on memory requests. The method further includes step S2 of keeping track of memory requests to the memory banks of each vertical stack of memory banks and step S3 of scheduling the memory requests to the memory banks of each vertical stack of memory banks based on the power delivery limit for each subset of TSV columns connecting the corresponding vertical stack of memory banks.

In one embodiment, the computer implemented method keeping track of memory requests by a scorecard module embedded in the controller on a logic layer of the vertical stack of memory banks. The computer implemented method may also include scheduling the memory requests by a scheduler module embedded in the controller on a logic layer of the vertical stack of memory banks. The computer implemented method may include a scheduler module comprised of a counter. In one embodiment, the scheduler module may be comprised of multiple FIFO's that keep track of requests issued in any given cycle and expected cycle when responses arrive on the TSVs. The computer implemented method may further include scheduling a limited set of memory requests to the vertical stack of memory banks connected by the corresponding subset of TSV columns. The computer implemented method may also include scheduling the memory requesters by spreading the memory requests to different TSV columns connecting the vertical stack of memory banks.

Figure 6:
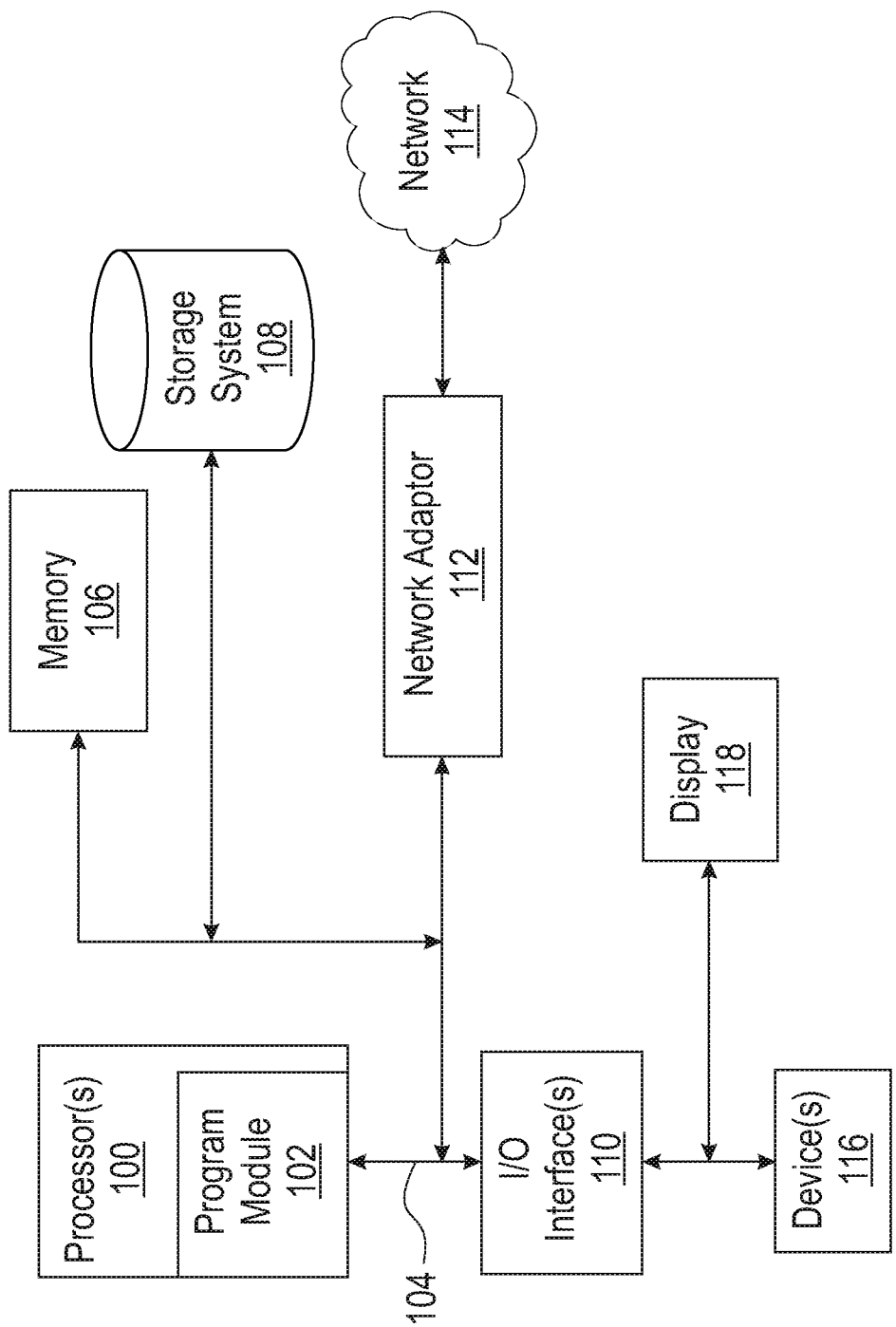
FIG. 6 is a block diagram of an exemplary computing system suitable for implementation of the embodiments of the invention disclosed in this specification.

FIG. 6 illustrates a schematic of an example computer or processing system that may implement the method for managing power in a 3D chip stack, in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 6 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 100, a system memory 106, and a bus 104 that couples various system components including system memory 106 to processor 100. The processor 100 may include a program module 102 that performs the methods described herein. The module 102 may be programmed into the integrated circuits of the processor 100, or loaded from memory 106, storage device 108, or network 114 or combinations thereof.

Bus 104 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 106 can include computer system readable media in the form of volatile memory, such as random access memory (RAM) and/or cache memory or others. Computer system may further include other removable/non-removable, volatile/non-volatile computer system storage media. By way of example only, storage system 108 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 104 by one or more data media interfaces.

Computer system may also communicate with one or more external devices 116 such as a keyboard, a pointing device, a display 118, etc.; one or more devices that enable a user to interact with computer system; and/or any devices (e.g., network card, modem, etc.) that enable computer system to communicate with one or more other computing devices. Such communication can occur via Input/Output (I/O) interfaces 110.

Still yet, computer system can communicate with one or more networks 114 such as a local area network (LAN), a general wide area network (WAN), and/or a public network (e.g., the Internet) via network adapter 112. As depicted, network adapter 112 communicates with the other components of computer system via bus 104. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a non-transitory computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

In addition, while preferred embodiments of the present invention have been described using specific terms, such description is for illustrative purposes only, and it is to be understood that changes and variations may be made without departing from the spirit or scope of the following claims.

What is claimed is:

1. A computer implemented method for managing power in a 3D chip stack comprising:
    determining a power delivery limit based on memory requests for each of a plurality of subsets of Through Silicon Vias (TSVs) connecting a corresponding vertical stack of memory banks of a 3D chip stack; and
    scheduling the memory requests to the memory banks of each vertical stack of memory banks based on the power delivery limit for each subset of TSVs connecting the corresponding vertical stack of memory banks.

2. The computer implemented method of claim 1, further including keeping track of the memory requests using a scorecard module embedded in a controller on a logic layer of the vertical stack of memory banks.

3. The computer implemented method of claim 1, wherein scheduling the memory requests is performed by a scheduler module embedded in a controller on a logic layer of the vertical stack of memory banks.

4. The computer implemented method of claim 3, wherein the scheduler module is comprised of a counter.

5. The computer implemented method of claim 3, wherein the scheduler module is comprised of multiple FIFO's that keep track of requests issued in any given cycle and expected cycle when responses arrive on the TSVs.

6. The computer implemented method of claim 1, wherein scheduling the memory requests includes scheduling a limited set of memory requests to the vertical stack of memory banks connected by the corresponding subset of TSVs.

7. The computer implemented method of claim 1, wherein scheduling the memory requests includes spreading the memory requests to different TSVs connecting the vertical stack of memory banks.

8. The computer implemented method of claim 2, wherein keeping track of memory requests includes tracking memory sub-commands, the sub-commands including one or more of read, write, precharge, activate, refresh and scrub.

9. A computer system for managing power in a 3D chip stack comprising:
    one or more computer processors;
    one or more non-transitory computer-readable storage media;
    program instructions, stored on the one or more non-transitory computer-readable storage media, which when implemented by the one or more processors, cause the computer system to perform the steps of:
        determining a power delivery limit based on memory requests for each of a plurality of subsets of Through Silicon Vias (TSVs) connecting a corresponding vertical stack of memory banks of a 3D chip stack; and
        scheduling the memory requests to the memory banks of each vertical stack of memory banks based on the power delivery limit for each subset of TSVs connecting the corresponding vertical stack of memory banks.

10. The computer system of claim 9, further including keeping track of the memory requests using a scorecard module embedded in a controller on a logic layer of the vertical stack of memory banks.

11. The computer system of claim 9, wherein scheduling the memory requests is performed by a scheduler module embedded in a controller on a logic layer of the vertical stack of memory banks.

12. The computer system of claim 11, wherein the scheduler module is comprised of a counter.

13. The computer system of claim 11, wherein the scheduler module is comprised of multiple FIFO's that keep track of requests issued in any given cycle and expected cycle when responses arrive on the TSVs.

14. The computer system of claim 9, wherein scheduling the memory requests includes scheduling a limited set of memory requests to the vertical stack of memory banks connected by the corresponding subset of TSVs.

15. The computer system of claim 9, wherein scheduling the memory requests includes spreading the memory requests to different TSVs connecting the vertical stack of memory banks.

16. The computer system of claim 10, wherein keeping track of memory requests includes tracking memory sub-commands, the sub-commands including one or more of read, write, precharge, activate, refresh and scrub.

17. A computer program product comprising:
    program instructions on a computer-readable storage medium, where execution of the program instructions using a computer causes the computer to perform a method for managing power in a 3D chip stack, the program instructions causes the computer to perform the steps of:
        determining a power delivery limit based on memory requests for each of a plurality of subsets of Through Silicon Vias (TSVs) connecting a corresponding vertical stack of memory banks of a 3D chip stack; and
        scheduling the memory requests to the memory banks of each vertical stack of memory banks based on the power delivery limit for each subset of TSVs connecting the corresponding vertical stack of memory banks.

18. The computer program product of claim 17, further including keeping track of the memory requests using a scorecard module embedded in a controller on a logic layer of the vertical stack of memory banks.

19. The computer program product of claim 17, wherein scheduling the memory requests is performed by a scheduler module embedded in a controller on a logic layer of the vertical stack of memory banks.

20. The computer program product of claim 17, wherein scheduling the memory requests includes scheduling a limited set of memory requests to the vertical stack of memory banks connected by the corresponding subset of TSVs.

* * * * *